United States Patent [19]

Bione et al.

[11] 4,183,276
[45] Jan. 15, 1980

[54] PEDAL TEACHING AID FOR AN ELECTRONIC MUSICAL INSTRUMENT

[75] Inventors: Angelo A. Bione, Chicago; Donald R. Sauvey, Palatine, both of Ill.

[73] Assignee: Marmon Company, Chicago, Ill.

[21] Appl. No.: 804,809

[22] Filed: Jun. 8, 1977

[51] Int. Cl.$^2$ .................. G10F 1/00; G09B 15/00; G09B 15/08
[52] U.S. Cl. .................. 84/1.03; 84/464; 84/470; 84/478
[58] Field of Search .................. 84/1.01, 1.03, 1.17, 84/1.24, DIG. 25, 426, 444, 464, 470, 477, 478

[56] References Cited

U.S. PATENT DOCUMENTS

| | | | |
|---|---|---|---|
| 3,118,961 | 1/1964 | Peterson | 84/1.17 |
| 3,503,290 | 3/1970 | Schmoter et al. | 84/478 |
| 3,503,297 | 3/1970 | Schmoter et al. | 84/478 |
| 3,731,582 | 5/1973 | Gullickson | 84/478 |
| 3,837,256 | 9/1974 | Gullickson | 84/478 |
| 3,881,390 | 5/1975 | Gullickson | 84/478 |
| 3,895,555 | 7/1975 | Peterson et al. | 84/470 |
| 3,921,491 | 11/1975 | Freeman | 84/1.01 |
| 4,012,979 | 3/1977 | Wemekamp | 84/1.01 |

Primary Examiner—Vit W. Miska
Attorney, Agent, or Firm—Neuman, Williams, Anderson & Olson

[57] ABSTRACT

A pedal teaching system for an electronic musical instrument, specifically an electronic organ. In the rehearse mode of operation the system rhythmically energizes selected ones of a plurality of lights mounted above the pedal clavier to illustrate which pedals form a bass note accompaniment routine for a specific group of keys depressed by the organist and automatically sounds the bass note routine. In the perform mode of operation the system rhythmically energizes selected ones of the plurality of lights to illustrate which pedals form the bass note accompaniment routine and disables the automatic bass note musical output routine so that the organist must physically depress the actual pedals to provide the bass note accompaniment. In a non-rhythmic or static rehearse mode of operation the system iluminates the root bass pedal light corresponding to the chord played on the organ or the bass pedal light corresponding to the lowest frequency being depressed on the organ; and, automatically sounds the appropriate bass note. In a non-rhythmic or static perform mode the system only illuminates the appropriate pedal light.

10 Claims, 2 Drawing Figures

PEDAL TEACHING AID FOR AN ELECTRONIC MUSICAL INSTRUMENT

BACKGROUND OF THE INVENTION

1. Field of the Invention

The present invention is a pedal indicator and teaching system for an electronic musical instrument, specifically an electronic organ. In playing the electronic organ, it is common for the organist to play the melody with the right hand, the chord accompaniment with the left hand and the bass accompaniment with the left foot on the pedal clavier. The left hand chording is usually played at a different rhythm. It is difficult for the beginning organist to develop the dexterity and timing necessary to physically play the bass note accompaniment on the pedal clavier or to know which pedals form a suitable gass accompaniment routine for a particular combination of keys or chords played with the left hand. In addition, for the beginning organist, it is difficult to associate the chord played by the left hand to the bass root pedal of the pedal clavier corresponding to that chord.

The system visually indicates a bass note routine for accompanying a group of keys depressed by an instrument player by energizing selected ones of a plurality of lights mounted above the pedal clavier. The system also has the capability for automatically providing a musical bass note accompaniment output to complement the visual display. The instrument player selects whether the system operates with the audio and visual display or only the visual display. The system also has a selectable non-rhythmic mode in which it illuminates either the root bass note pedal light in response to a chord played by the organist, or the lowest bass note pedal light corresponding to the keys actually depressed. The instrument player selects whether the system sounds the single bass note or only illuminates the pedal light. Thus the system permits the organist to learn the association between the chords played and the bass note accompaniment routine or the association between the chord played and the root bass note.

While the present invention is described herein with reference to particular embodiments, it should be understood that the invention is not limited thereto. The pedal teaching and indicating system of the present invention may be employed in a variety of forms, as one skilled in the art will recognize in light of the present disclosure.

2. Prior Art

Teaching aids or systems for electronic organs which assist the instrument player in learning the musical relationship between the keys and the pedals and in developing the necessary hand and foot coordination and timing are well-known in the prior art. Some of these systems use light displays in association with the keyboard or pedal clavier to visually aid the organist in developing the appropriate playing skills.

Teaching systems in common use frequently rely upon preprogrammed data from a tape or other source separate from the organ to provide information for controlling the light displays or other visual indicia. In these systems the actual physical relationship between the left hand chord playing and the left foot bass note accompaniment is diluted and impaired. Frequently a beginning organist may be an accomplished keyboard musical artist such as a pianist, and fundamental instruction regarding the playing on a keyboard is unnecessary. However, the correlation between the keyboard playing and the playing of a bass note accompaniment routine on the pedal clavier has no counterpart in other instruments and must be mastered by every organist.

It is a general object of this invention to overcome the disadvantages of the prior pedal teaching systems.

An object of this invention is to provide a teaching aid to illustrate on a light panel positioned above the pedal clavier a bass note pedal routine for accompanying a chord or group of keys played.

Another object of this invention is to provide a teaching aid to visually illustrate to the organist a bass note pedal rountine for accompanying a chord or group of keys played and simultaneously to audibly illustrate the sound of the proper bass notes.

Another object of this invention is to provide a teaching aid to illustrate to the organist the root note pedal associated with a chord.

Another object of this invention is to provide a teaching aid to visually indicate to the organist the root note of a chord and to audibly illustrate the sound of the root note.

Another object of this invention is to provide a system for reducing a number of circuit lines necessary for uniquely driving one of a plurality of indicator devices in response to octavely related input data.

Another object of this invention is to provide a system responsive to octavely related input data in which the number of drivable indicator devices is easily expanded or reduced.

Other objects will be apparent from the summary and detailed description.

SUMMARY OF THE INVENTION

A pedal teaching aid and illumination system indicates which pedals form a bass note accompaniment routine for a specific group of keys depressed by the organist. The pedal illumination system comprises a sequence or panel of lights positioned slightly above the pedal clavier and cooperates with the Bass Note Generation System set forth in the co-pending application Ser. No. 804,739 now U.S. Pat. No. 4,144,788 issued Mar. 20, 1979, assigned to Hammond Corporation and incorporated herein by reference. In the preferred embodiment, the pedal illumination system operates with the root/fifth or low-high routine of the Bass Note Generation System since the walking bassline or scanned bassline from a complicated bass note pattern making the visual identification of pedals corresponding to the bass notes difficult to follow. However, it should be apparent that these more complicated basslines, if desired, can be illustrated by the pedal system as would be obvious to one of ordinary skill in the art.

The switch mounted on the organ console which activates the pedal teaching system also places the Bass Note Generation System in the root/fifth mode of operation. As fully explained in the Bass Note Generation System disclosure, the input data received from a select number of keys on the organ keyboard is processed to determine if it is in a normalized chord pattern and, if so, a bass note value corresponding to the root note of the chord and a bass note value corresponding to the fifth of the chord are applied at appropriate times to a decoder-keyer circuit to provide a musical output. If the system fails to recognize the input data as a normalized chord pattern, a bass note value corresponding to the lowest note key depressed by the organist and a bass note value corresponding to the highest note key depressed by the organist are applied at appropriate times to a decoder-keyer circuit to provide a musical output.

The pedal teaching system has two major modes of operation which are selectable by the instrument player by closing the rehearse/perform switch on the instrument console. The rehearse-perform switch of the teaching system is connected to the output line of the pedal-walk switch of the Bass Note Generation System. Thus, the instrument player by placing the rehearse-perform switch in the perform position also places the Bass Note Generation System in the pedal mode. It should be apparent to one of ordinary skill that a single switch can perform both for the Bass Note Generation System and the teaching system or independent switches can be provided. In the rehearse mode of operation, the pedal teaching system receives serial bass note data from the digital bass note value generator and rhythmically indicates by energizing appropriate ones of a plurality of lights mounted above the pedal clavier which pedals form a bass note accompaniment routine for the chord played by the organist. The decoder-keyer circuit of the Bass Note Generation System also receives the serial bass note data and provides a musical bass note routine output in unison with the light display. Thus, the instrument player depresses a chord key combination on the manual and hears the accompaniment root/fifth bass note output routine and sees the correct pedals illuminated in the proper timing sequencing.

In the perform mode of operation, the Bass Note Generation System is placed in the high select pedal mode by closing the switch P/W on the instrument console. The instrument player depresses a key combination on the manual and the serial bass note value data corresponding to the accompaniment root/fifth routine is received by the pedal teaching system which indicates by energizing appropriate ones of the plurality of lights which pedals form a bass note accompaniment routine for the chord played. However, the decoder-keyer circuit is responsive to only the manual pedal inputs and does not provide a musical output routine in response to the serial bass note value data. Thus, the instrument player depresses a chord key combination on the manual and the pedal system illuminates the pedals to be depressed for providing an accompaniment root/fifth output routine but the organist must actually depress the pedals themselves to provide the musical output.

Of course, if the organist depresses a group of keys on the manual that do not form a recognizable chord pattern, the digital bass note value generator provides a low-high note output routine and the pedal indicator operates as explained above. Therefore, whenever the root/fifth routine is specifically referred to in the specification the same type operation occurs in the low-high routine when the group of depressed keys are not recognized as a chord pattern.

The instrument player can disable the tempo clock or timing input to the Bass Note Generation System by closing a switch on the instrument console. The pedal teaching system now becomes a static or nonrythmic system. In the static rehearse mode of operation the pedal system receives the digital bass note value representing the root of the chord played by the organist and illuminates the root bass light corresponding to the chord and the decoder-keyer circuit automatically sounds the root bass note. In the static perform mode of operation the pedal system again receives the digital bass note value representing the root of the chord played by the organist and illuminates the root bass pedal light corresponding to the chord. However, the decoder keyer circuit does not respond to the bass note value data when the teaching system is in the perform mode of operation but only the manual pedal inputs so that the organist must physically depress the pedal to provide the musical root bass note output.

The serial digital note value information and the enable signal from the bass note value generator of the Bass Note Generation System is received by a series to parallel converter of the pedal teaching system. The serial data is converted into a five bit digital value. The binary bit 4 line and bit 8 line and bit 16 line are supplied as inputs to a group decoder circuit and the binary bit 2 line and binary bit 1 line are applied as inputs to an individual decoder circuit. The bit 16 line is connected to the enable input of group decoder and the pedal indicator switch is connected through an inverter to the enable input of individual decoder. The group decoder has a plurality of output lines representing that the digital value of the input signal is in one of five numerical groups. The individual decoder has a plurality of output lines representing that the digital value of the input signal is among one of four numerical groups. Each output of the group decoder is applied to a driver and each output of the individual decoder is applied to a driver. The output of each group driver is connected to the anode of a bank of light emitting diodes or LED's and the cathode of each LED in that group is connected to a respective one of the individual driver outputs. The output of one group driver and one individual driver uniquely operates a single LED. The LED's are the light sources mounted on the panel above the pedal clavier. Thus, a plurality of LED or other loads can be individually energized by a substantially smaller number of input lines. The decoder system uniquely operates with octavely related information to permit expansion or contraction of the number of load devices upon receipt of additional octave data.

The pedal teaching system is described with twenty light sources for clarity since the bass note value data from the Bass Note Generation System has a twenty note range. However, in the preferred embodiment, the pedal teaching system is associated with a standard spinet organ which has only thirteen pedals and, therefore, uses only one octave or twelve bass notes and the output of the decoder-keyer circuit is appropriately restricted to one octave. Therefore, the bass note value data exceeding the playing range of the spinet organ is folded back into the proper frequency range by straping appropriate outputs of the group decoder to the outputs representing lower frequency range outputs. It should be apparent to one of ordinary skill in the art that the pedal teaching system can be expanded or increased to include the larger pedal clavier of a console organ.

DETAIL DESCRIPTION

Figure 1:
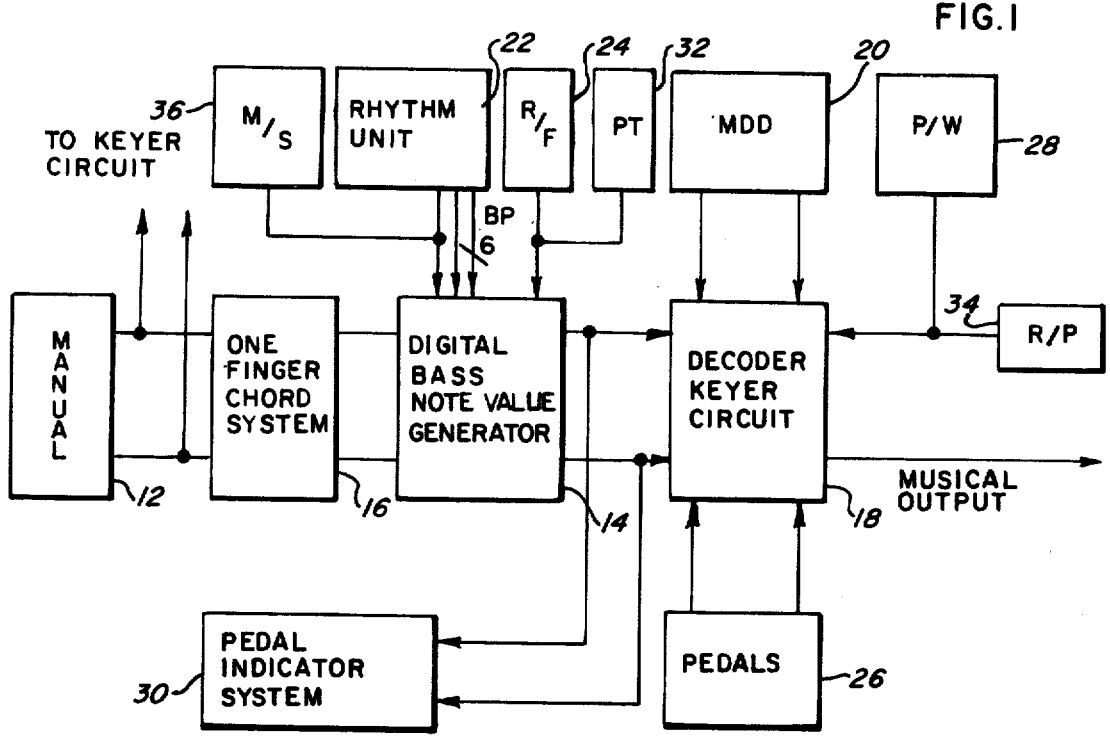
FIG. 1 is a block diagram of the pedal indicator system in circuit connection with the Bass Note Generation System; and, FIG. 2 is a schematic diagram of the pedal indicator system of the present invention.

FIG. 1 illustrates in block diagrams, the pedal teaching system of the present invention connected in circuit with the Bass Note Generation System of Ser. No.

804,739 now U.S. Pat. No. 4,144,788 issued Mar. 20, 1979, assigned to Hammond Corporation. In the preferred embodiment, the pedal teaching and indication system 30 receives the serial bass note value data and enable signal from the digital bass note value generator 14. To operate the pedal teaching system, the organist closes the pedal system on/off switch 32 which is mounted on the instrument console. The output line of the pedal teaching or PT switch 32 is connected to the output line of the root/fifth switch 24. Thus, by closing the PT switch 32, the organist places the Bass Note Generation System in the root/fifth mode of operation and activates the pedal indicator system.

The Bass Note Generation System is now in the root/fifth mode and provides a musical root/fifth bass note output routine if the combination of keys depressed by the organist on the manual 12 forms a recognizable chord pattern or the system provides a musical low-high bass note output routine if the combination of keys depressed by the organist on the manual 12 does not form a recognizable chord pattern. The digital bass note value generator 14 receives timing and rhythm inputs from the standard organ rhythm unit 22 and provides a digital bass note value at the appropriate time or beat in the bass routine and a synchronizing enable signal. The digital bass note output value represents the root or fifth bass note of the recognized chord or the lowest or highest bass note corresponding to the keys actually depressed by the organist.

The digital bass note value data and the enable signal are received by the decoder-keyer circuit 18 and the pedal teaching system 30. The decoder-keyer circuit 18 receives twelve frequency signals from the top octave generators or MDD circuit 20 and the data from the digital bass note value generator 14. The decoder-keyer circuit 18 decodes the data to select one of the MDD frequencies, divides that frequency into the bass note range, and supplies the bass note frequency to a keyer circuit to provide a musical output.

The pedal teaching system 30 receives the digital bass note value information and the synchronizing enable signal. The teaching system rhythmically illuminates the particular light sources associated with the pedals directly corresponding to the root/fifth routine for the chord played. Of course, if no recognizable chord is played, the digital bass note value data corresponds to the lowest or highest key depressed by the organist and the pedal teaching system rhythmically illuminates the appropriate bass pedal light. Thus, when the organist plays a chord on the keyboard, the decoder-keyer circuit 18 plays the root/fifth bass note routine for that chord and the pedal teaching system rhythmically illuminates the root pedal light and fifth pedal light to coincide with the decoder-keyer circuit 18 playing the root note or the fifth note. The organist can both hear the root/fifth base note routine appropriate for a particular chord and see the correct rhythmic timing and the correct pedals to be depressed to provide the proper bass note routine. Of course, the same operation occurs for a low-high bass note routine if the keys depressed by the instrument player do not form a recognizable chord pattern.

If the P/W switch 28 mounted on the instrument console is turned on by the organist, the Bass Note Generation System is placed in the manual high select pedal mode of operation. In this mode of operation, the digital note value data and enable signal is still provided by the digital bass note value generator but is not utilized by the decoder-keyer circuit 18. The decoder-keyer circuit now only responds to input data received from the pedal clavier 26 of the organ. The decoder-keyer selects the highest frequency pedal signal input, chooses an appropriate MDD frequency corresponding to the pedal signal, divides the MDD frequency into bass range and supplies the bass range frequency signal to the keyer circuit to provide a musical output.

To place the pedal teaching system 30 in the perform mode, the organist closes the rehearse/perform or R/P switch 34 mounted on the instrument console. The output of R/P switch 34 is connected to the output of P/W switch 28 and places the Bass Note Generation System in the manual pedal high select mode. Now, the bass note value data and the enable signal are received by the pedal teaching system 30 but are not used by the decoder-keyer circuit 18. The pedal teaching system 30 rhythmically illuminates the root pedal light and the fifth pedal light to coincide with the appropriate root/fifth routine as described above. However, the organist must now perform by actually depressing the pedals to produce an audible bass note output.

The instrument player can select a non-rhythmic rehearse or non-rhythmic perform mode of operation by turning off the tempo clock input to the digital bass note value generator from the rhythm unit 22. In the preferred embodiment, the tempo clock signal is eliminated by turning off a switch on the organ console which controls the rhythm unit. As an alternative, a moving/static or M/S switch 36 is connected to the tempo output line of the rhythm unit 22. In the moving or OFF position of switch 36, the pedal system 30 operates as described above. In the static or ON position, the M/S switch turns the beat counter of the digital bass note generator 14 off. With the beat counter off, the digital bass note generator provides only the digital bass note value corresponding to the root of a recognized chord or the lowest note value of the keys actually depressed if no chord pattern is recognized. The pedal system 30 operates as described above for the rehearse or perform mode, but the only pedal light illuminated corresponds to the root bass note. Thus, if the organist depresses a combination of keys forming a chord or utilizes the optional one finger chord system 16 and depresses a single key corresponding to a chord, the organist sees the pedal light corresponding to the root base note for that chord. Since the rhythm input is off, the pedal system 30 is static with only the root pedal light illuminated and the usual rhythmic movement between the root pedal light and the fifth pedal light is eliminated.

Figure 2:
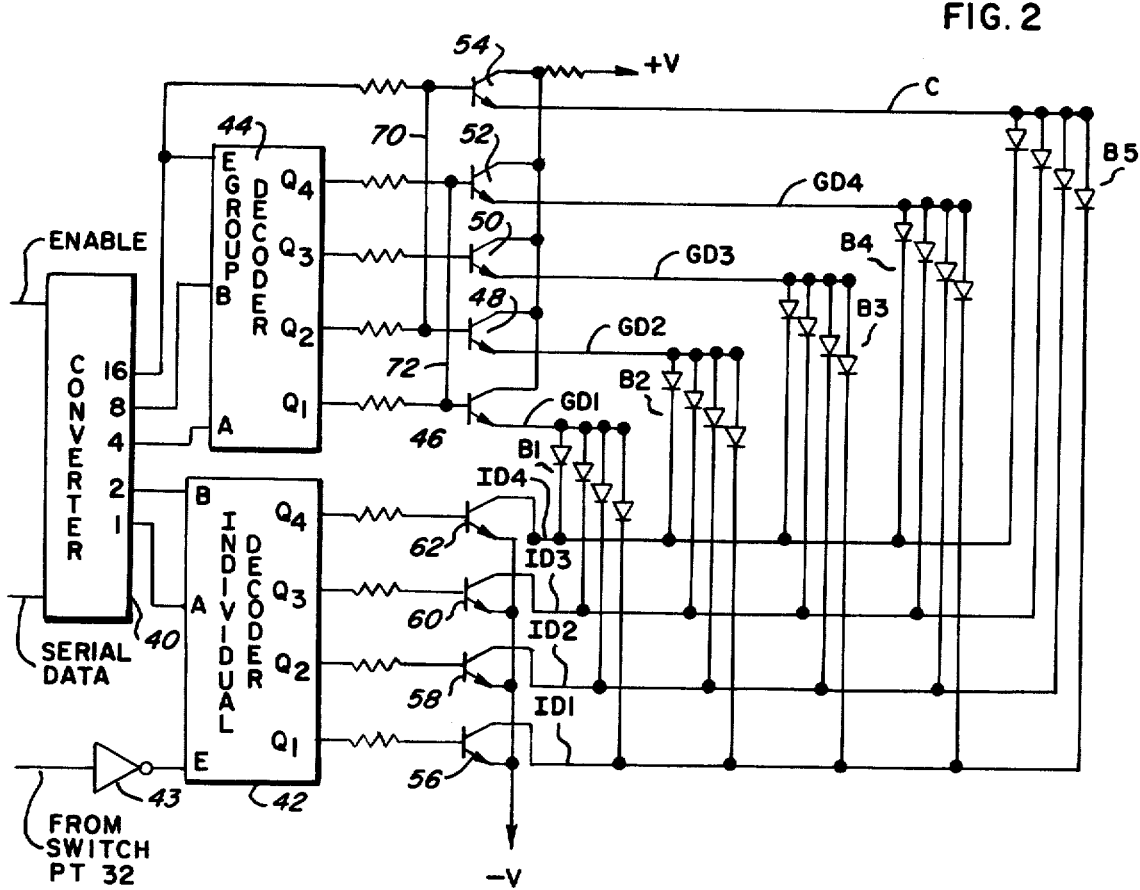

FIG. 2 is a detailed schematic of the pedal teaching system 30. If the instrument player turns PT switch 32 to the ON position, the system is activated. The enable signal and the digital bass note value from generator 14 are received at the inputs to series to parallel converter 40. The series to parallel converter 40 is a standard device well-known in the art and further description is deemed unnecessary. The logic discussed throughout the specification is clocked logic which is well-known to those of ordinary skill in the art. Hence for clarity of description no specific reference is made to the clock signals inherent in the system. The digital bass note value is converted into a five bit digital signal at the five output lines of converter 40. The least significant bit line or bit line 1 and bit line 2 are respectively connected to inputs A and B of individual decoder 42. The bit line 4 and bit line 8 from converter 40 are respectively connected to inputs A and B of group decoder 44. The individual decoder is activated if the input signal to enable terminal E is at logic 0 state. When the instrument player turns the PT switch 32 to the ON position, the inverter 43 receives a logic 1 state signal at its input. The logic 0 state signal at the output of inverter 43 is connected to the enable terminal E activating the individual decoder 42. The bit line 16 from the converter 40 is connected to the enable terminal E of group decoder 44. The group decoder is activated if the bit line 16 is in the logic 0 state and is deactivated if bit line 16 is in the logic 1 state. The group decoder 44 and the individual decoder 42 are well-known devices in the art which provide an output signal on one of four lines depending on the binary value at its input such as the Motorola binary decoder No. MC 14555.

The code or truth table for the group decoder 44 is as follows:

CHART 1

| BINARY VALUE | GROUP DECODER INPUTS (BA) | GROUP DECODER OUTPUT |
|---|---|---|
| 00000 | 00 | Q1 |
| 00001 | 00 | Q1 |
| 00010 | 00 | Q1 |
| 00011 | 00 | Q1 |
| 00100 | 01 | Q2 |
| 00101 | 01 | Q2 |
| 00110 | 01 | Q2 |
| 00111 | 01 | Q2 |
| 01000 | 10 | Q3 |
| 01001 | 10 | Q3 |
| 01010 | 10 | Q3 |
| 01011 | 10 | Q3 |
| 01100 | 11 | Q4 |
| 01101 | 11 | Q4 |
| 01110 | 11 | Q4 |
| 01111 | 11 | Q4 |

Thus, upon receipt of binary values 0 through 3 the Q1 output line of group decoder 44 is set to a logic 1 state, upon receipt of binary values 4 through 7 the Q2 output line is set to a logic 1 state, upon receipt of binary values 8 through 11 the Q3 output line is set to a logic 1 state, and upon receipt of binary values 12 through 15 the Q4 output line is set to a logic 1 state. At binary value 10000, the input on bit line 16 to group decoder 44 is at a logic 1 and the group decoder 44 is deactivated.

Each output line Q1 through Q4 of group decoder 44 is respectively connected to a driver 46, 48, 50 and 52. In the preferred embodiment, each driver is a transistor which receives the respective output of group decoder 44 at its base terminal, has its collector terminal tied in common to a positive voltage source V through a resistor and has its emitter respectively connected to lines GD 1 through GD 4. The bit line 16 from converter 40 is connected to the bass of driver 54. The collector of driver 54 is connected to the common voltage V and its emitter is connected to line C.

The code or truth table for the individual decoder 42 is as follows:

CHART 2

| BINARY VALUE | INDIVIDUAL DECODER INPUTS BA | INDIVIDUAL DECODER OUTPUT |
|---|---|---|
| 00000 | 00 | Q1 |
| 00001 | 01 | Q2 |
| 00010 | 10 | Q3 |
| 00011 | 11 | Q4 |
| 00100 | 00 | Q1 |
| 00101 | 01 | Q2 |

CHART 2-continued

| BINARY VALUE | INDIVIDUAL DECODER INPUTS BA | INDIVIDUAL DECODER OUTPUT |
|---|---|---|
| 00110 | 10 | Q3 |
| 00111 | 11 | Q4 |
| 01000 | 00 | Q1 |
| 01001 | 01 | Q2 |
| 01010 | 10 | Q3 |
| 01011 | 11 | Q4 |
| 01100 | 00 | Q1 |
| 01101 | 01 | Q2 |
| 01110 | 10 | Q3 |
| 01111 | 11 | Q4 |
| 10000 | 00 | Q1 |
| 10001 | 01 | Q2 |
| 10010 | 10 | Q3 |
| 10011 | 11 | Q4 |

Thus, upon receipt of a binary signal with a 0 as the least significant bit and 0 in the second bit position, the Q1 output line of individual decoder 42 is set to a logic 1 state. In the above code the Q1 output line is set to a logic 1 state upon receipt of binary values 0, 4, 8, 12 and 16. In a similar manner the Q2 output line is set to a logic 1 state upon receipt of binary values 1, 5, 9, 13 and 17, the Q3 output line is set to a logic 1 upon receipt of binary values 2, 6, 10, 14 and 18, and the Q4 output line is set to a logic 1 state upon receipt of binary values 3, 7, 11, 15 and 19. Of course, the remaining binary bits have no effect on the outputs of the individual decoder 42.

Each output line Q1 through Q4 of individual decoder 42 is respectively connected to the base of driver transistor 56, 58, 60 and 62. The emitter of each driver 56 through 62 is connected in common to a negative voltage V− and the collectors are respectively connected to lines ID1, ID2, ID3 and ID4.

The line GD1 from driver 46 is connected to the anodes of a first bank of four LED devices B1. It should be apparent to one of ordinary skill in the art that other standard light sources can be used. The line GD2 from driver 48 is connected to the anodes of a second bank of four LED devices B2. The line GD3 is connected to the anodes of a third bank of LED devices B3. The line GD4 is connected to the anodes of a fourth bank of LED devices B4. The line C from driver 54 is connected to the fifth bank of LED devices B5. The line ID1 is connected to the cathode of the first LED in bank B1, and the first LED in each of the banks B2 through B5. The line ID2 is connected to the cathode of the second LED in bank B2, and the second LED in each of the banks B2 through B5. The line ID3 is connected to the third LED in bank B1, and the third LED in each of the banks B2 through B5. The line ID4 is connected to the fourth LED bank B1, and the fourth LED in each of the banks B2 through B5.

For example, upon receipt of the binary value 00110, the group decoder 44 receives a logic 0 from bit line 8 at input terminal B and logic 1 from bit line 4 at input terminal A. The individual decoder 42 receives a logic 1 from bit line 2 at input terminal B and a logic 0 from bit line 1 at input terminal A. The group decoder 44 provides a logic 1 output on line Q2 in accord with Chart 1. The driver 48 is turned on and line GD2 is at a positive potential. The individual decoder 42 provides a logic 1 output on line Q3 in accord with Chart 2. The driver 60 is turned on and line ID3 is at a negative potential. Thus, the third LED in bank B2 is energized.

It is apparent that as the binary bass note value input varies between binary 0 through binary 19 corresponding to the twenty keys from the organ manual a unique one of the diodes in the various banks is energized in accord with the following code.

CHART 3

| BINARY VALUE | GROUP DECODER LINE | INDIVIDUAL DECODER LINE | LED BANK AND POS. | |
|---|---|---|---|---|
| 00000 | GD1 | ID1 | B1 | P1 |
| 00001 | GD1 | ID2 | B1 | P2 |
| 00010 | GD1 | ID3 | B1 | P3 |
| 00011 | GD1 | ID4 | B1 | P4 |
| 00100 | GD2 | ID1 | B2 | P1 |
| 00101 | GD2 | ID2 | B2 | P2 |
| 00110 | GD2 | ID3 | B2 | P3 |
| 00111 | GD2 | ID4 | B2 | P4 |
| 01000 | GD3 | ID1 | B3 | P1 |
| 01001 | GD3 | ID2 | B3 | P2 |
| 01010 | GD3 | ID3 | B3 | P3 |
| 01011 | GD3 | ID4 | B3 | P4 |
| 01100 | GD4 | ID1 | B4 | P1 |
| 01101 | GD4 | ID2 | B4 | P2 |
| 01110 | GD4 | ID3 | B4 | P3 |
| 01111 | GD4 | ID4 | B4 | P4 |
| 10000 | C | ID1 | B5 | P1 |
| 10001 | C | ID2 | B5 | P2 |
| 10010 | C | ID3 | B5 | P3 |
| 10011 | C | ID4 | B5 | P4 |

The above description provides for a LED display corresponding to each key associated with the Bass Note Generation System on the manual 12. However, the standard spinet organ has only thirteen pedals and the bass note value data above this bass range is not useful. In the preferred embodiment, the pedal teaching system is used on a spinit organ with the limited pedal range and the bass note value data received by the converter 40 which corresponds to notes above the first twelve pedal octave range is folded back in to the pedal octave range. The decoder-keyer circuit can be restricted to playing the bass note musical output in one octave by use of the second octave input. Thus, only twelve LED devices are necessary and are positioned above the first twelve pedals. It should be apparent to one of ordinary skill in the art that the last or thirteenth pedal could also be equipped with a corresponding LED device and the circuit modified to appropriately energize this LED device.

In the preferred embodiment the octave foldback is achieved by connecting the bit line 16 to output line Q2 of the group decoder 44 by strap 70 and by connecting output line Q4 to output line Q1 of the group decoder 44 by strap 72. Thus, if binary value 01110 is received by converter 40, the group decoder output Q4 is at a logic 1 and individual decoder output line Q3 is at a logic 1. The group decoder line Q4 is connected by strap 72 to line Q1 so that driver 46 is on and line GD1 is at positive potential. The line ID3 is at a negative potential and the LED in bank B1 at the third position is activated. It should be apparent to one of ordinary skill in the art that the LED banks B4 and B5 together with drivers 52 and 54 can be eliminated or just not used in the limited octave embodiments. Therefore, the binary value 01110 is folded back to energize the LED in the lower octave.

The following chart sets forth the folded back information code:

CHART 4

| BINARY VALUE | GROUP DECODER LINE | INDIVIDUAL DECODED LINE | LED BANK AND POS. |
|---|---|---|---|
| 00000 | GD1 | ID1 | B1 P1 |
| 00001 | GD1 | ID2 | B1 P2 |
| 00010 | GD1 | ID3 | B1 P3 |
| 00011 | GD1 | ID4 | B1 P4 |
| 00100 | GD2 | ID1 | B2 P1 |
| 00101 | GD2 | ID2 | B2 P2 |
| 00110 | GD2 | ID3 | B2 P3 |
| 00111 | GD2 | ID4 | B2 P4 |
| 01000 | GD3 | ID1 | B3 P1 |
| 01001 | GD3 | ID2 | B3 P2 |
| 01010 | GD3 | ID3 | B3 P3 |
| 01011 | GD3 | ID4 | B3 P4 |
| 01100 | GD1 | ID1 | B1 P1 |
| 01101 | GD1 | ID2 | B1 P2 |
| 01110 | GD1 | ID3 | B1 P3 |
| 01111 | GD1 | ID4 | B1 P4 |
| 10000 | GD2 | ID1 | B2 P1 |
| 10001 | GD2 | ID2 | B2 P2 |
| 10010 | GD2 | ID3 | B2 P3 |
| 10011 | GD2 | ID4 | B2 P4 |

The present decoder system can be increased to process binary data with a sixth bit by providing an additional group decoder in place of the present driver transistor 54 and an additional transistor to receive the sixth or 32nd bit line at its base. The expansion of the system to receive a six bit binary data input extends its range to three octaves. In the three octave system the lowest octave group decoder is enabled upon receipt of a logic 0 state at terminal E. The terminal E is connected to the output of an OR gate which receives at its input the bit 16 line and the bit 32 line. The higher octave group decoder receives at its A and B inputs the same bit 4 line and bit 8 line as the lowest octave group decoder. The enable terminal E of the higher octave group decoder is connected to the output of an OR gate which receives at its input the inverted bit 16 line and the bit 32 line. The remainder of the system operates as described for the preferred embodiment. Thus, the decoder system receives binary data and drives an octavely relate number of loads and can be easily increased to accommodate an octavely relate increase in loads.

It is to be understood that the present disclosure is to be interpreted in its broadest sense and the invention is not limited to the specific embodiments disclosed. Furthermore, the embodiments set forth can be modified or varied by applying current knowledge without department from the spirit and scope of the novel concepts of the invention.

Having described the invention, what is claimed is:

1. An electronic organ having a keyboard, a pedal clavier, a generator responsive to said keyboard for providing data representative of a bass note routine and a pedal indicator system positioned in proximity to said pedal clavier and comprising:
- a converter responsive to said bass note routine data for providing a plurality of binary output signals;
- a decoder circuit responsive to said binary output signals and having a plurality of decoder output lines and comprising:
- an individual decoder circuit responsive to the two least significant bits of said binary output signals and having a plurality of individual decoder output lines; and
- said individual decoder providing a signal on one of said plurality of decoder output lines representative of the binary value of said two least significant bits of said binary output signals;
- at least one group decoder circuit responsive to the remainder of said binary output signals and having a plurality of group decoder output lines;
- said group decoder circuit providing a signal on one of said plurality of group decoder output lines representative of the binary value of the remainder of said binary output signals;
- light means comprising a plurality of banks of light sources and each of said banks having a plurality of light sources and said light means being connected to said decoder output lines;
- each of said individual decoder output lines from said individual decoder are connected in circuit to one of said light sources in each of said banks; and
- each of said group output lines from said group decoder are connected in circuit to all of said light sources in respective ones of said banks;
- said bass note routine data contains octavely related information corresponding to a number of keys on said keyboard;
- said decoder circuit rhythmically providing an output signal on selected ones of said output lines to uniquely drive respective ones of said plurality of light sources in unison with said bass note routine; and
- an octave limiter means connected in circuit to at least some of said group decoder output lines for folding back octavely related data exceeding the octave capacity of said light means into a lower octave range.

2. A pedal indicator system as set forth in claim 1 wherein said individual decoder output signal in combination with said group decoder output signal uniquely energize one of said light sources for indicating the pedal in said pedal clavier associated with the bass note forming part of said bass note routine.

3. A pedal indicator system as set forth in claim 2 further comprising a decoder-keyer circuit receiving said data representative of a bass note routine for rhythmically providing a musical bass note output corresponding to said bass note routine.

4. A pedal indicator system as set forth in claim 3 further comprising a switch means actuable by an instrument player and connected in circuit to said decoder keyer for disabling said decoder-keyer from using said data representative of said bass note routine.

5. A pedal indicator system as set forth in claim 4 wherein said decoder-keyer circuit is connected in circuit with said pedal clavier for providing a musical bass note output in response to the depression of one of said pedals so that the instrument player can depress the pedal associated with said energized light source to produce the appropriate musical bass note forming part of said bass note routine.

6. An electronic organ having a keyboard, a pedal clavier, a generator responsive to said keyboard for providing data representative of a bass note routine, a switch means actuable by an instrument player and connected in circuit to said generator for causing said generator to provide data representative of a bass root note of a chord played on said keyboard, and a pedal indicator system positioned in proximity to said pedal clavier and comprising:
- a converter responsive to said bass note routine data for providing a plurality of binary output signals;
- a decoder circuit responsive to said binary output signals and having a plurality of decoder output lines and comprising:
- an individual decoder circuit responsive to the two least significant bits of said binary output signals and having a plurality of individual decoder output lines; and
- said individual decoder providing a signal on one of said plurality of decoder output lines representative of the binary value of said two least significant bits of said binary output signals;
- at least one group decoder circuit responsive to the remainder of said binary output signals and having a plurality of group decoder output lines;
- said group decoder circuit providing a signal on one of said plurality of group decoder output lines representative of the binary value of the remainder of said binary output signals;
- light means comprising a plurality of banks of light sources and each of said banks having a plurality of light sources and said light means being connected to said decoder output lines;
- each of said individual decoder output lines from said individual decoder are connected in circuit to one of said light sources in each of said banks; and
- each of said group output lines from said group decoder are connected in circuit to all of said light sources in respective ones of said banks;
- said decoder circuit providing an output signal on a selected ones of said output lines to uniquely drive respective ones of said plurality of light sources in unison with said bass root note; and,
- an octave limiter means connected in circuit to at least some of said group decoder output lines for folding back octavely related data exceeding the octave capacity of said light means into a lower octave range.

7. A pedal indicator system as set forth in claim 6 wherein said individual decoder output signal in combination with said group decoder output signal uniquely energize one of said light sources for indicating the pedal in said pedal clavier associated with said bass root note of said chord played on said keyboard.

8. A pedal indicator system as set forth in claim 7 further comprising a decoder-keyer circuit receiving said data representative of a bass root note for providing a musical bass note output corresponding to said bass root note.

9. A pedal indicator system as set forth in claim 8 further comprising a switch means actuable by an instrument player and connected in circuit to said decoder keyer for disabling said decoder keyer for using said data representative of said bass root note.

10. A pedal indicator system as set forth in claim 14 wherein said decoder-keyer circuit is connected in circuit with said pedal clavier for providing a musical bass note output in response to the depression of one of said pedals so that the instrument player can depress the pedal associated with said energized light source to provide the appropriate musical bass root note corresponding to said chord played on the keyboard.

* * * * *